Dec. 8, 1942.    T. R. SCOTT ET AL    2,304,210
INSULATED ELECTRIC CABLE
Filed Feb. 28, 1940

INVENTORS
THOMAS R. SCOTT
JOHN K. WEBB
JOHN F. MORLEY
BY
RCHopgood
ATTORNEY.

UNITED STATES PATENT OFFICE 2,304,210

INSULATED ELECTRIC CABLE

Thomas Robertson Scott, John Krauss Webb, and John Frederick Morley, London, England, assignors to International Standard Electric Corporation, New York, N. Y.

Application February 28, 1940, Serial No. 323,174
In Great Britain April 14, 1939

1 Claim. (Cl. 154—2.25)

This invention relates to electric cables for transmission of power and provided with plastic insulation.

A problem which occurs in all types of cables for power transmission is that of ionisation in voids formed either in the insulation itself or at the boundaries between the insulation and the conductor on the one hand and between the insulation and the surrounding conducting sheath. Such voids are particularly liable to form when the cable is bent or when the cable is heated and cooled alternately as by the intermittent loading of the cable by current. Many solutions have been proposed such as the maintenance of the insulation under oil or gas pressure or a combination of both oil and gas pressure and the provision of expansion and contraction chambers. These solutions have not so far been applied to cables having a plastic insulation such as for example a mixture of rubber and styrene.

It has therefore been proposed to provide the insulation with a conductive layer at its boundaries, so that the respective layers in contact with the insulation should have the same potential as the adjacent conductor on the one hand or sheath on the other hand and ionisation in any voids at these positions would not therefore occur. For example, it has been proposed to provide a cable in which the conductor was free to move in a space provided by a tubular sheath, formed for instance, of a brass tape in helical form, supporting the insulation. In another example, a layer of conductive rubber, i. e. rubber in which a large proportion of graphite is suspended, is interposed between the inner conductor and rubber insulation and another similar layer between the rubber insulation and the other sheath.

In such proposals, however, ionisation is still liable to occur in voids between the conductive layer or layers thus provided and the insulation.

According to the present invention we provide a conductive layer between the central conductor and the insulation (and between the insulation and outer metal sheath if the latter be present) and means for ensuring intimate contact between said conductive layer or layers and the insulation.

Figure 1:
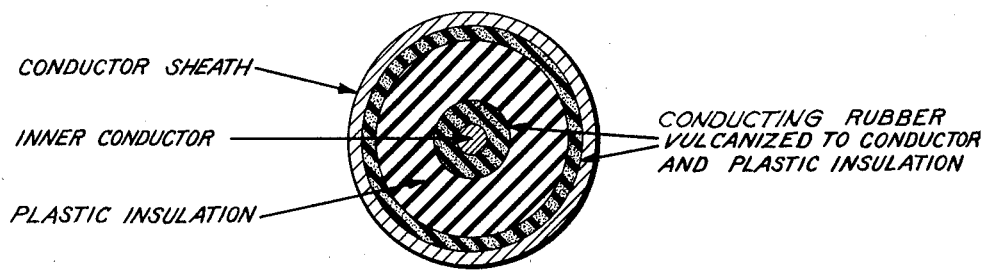
Figure 2:
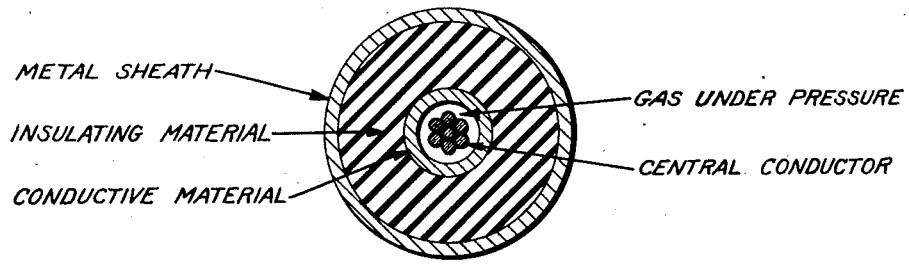

In the accompanying drawing Figs. 1 and 2 illustrate in sectional view cables embodying the principles of this invention.

In the case in which the conducting layer consists of conductive rubber and the plastic insulation also contains or consists of rubber, one means for ensuring intimate contact in accordance with the invention consists in adding to the rubber of the conducting layer and of the insulation the necessary ingredients for vulcanisation and the vulcanising of the layers after the layers are in position in the cable.

The conductive rubber may consist of 100 parts of rubber intimately mixed with 90 parts of acetylene black, and the plastic insulation of 80 parts of polystyrene, 20 parts of rubber and 30 parts of polyisobutylene. In each case there is added to the rubber before the above mixtures are formed, 2 parts of zinc oxide, 2 parts of sulphur and 0.3 part of tetramethylthiuram disulphide are mixed with 100 parts of the rubber.

The conductive rubber is then applied as a thin layer over the conductor by extrusion, the copper conductor being previously tinned; the plastic insulation is then tightly extruded over the conductive rubber. If an outer metal sheath is to be used a further layer of conductive rubber is tightly extruded over the plastic insulation. The extruded layers are then vulcanised whilst in position on the conductor. The different layers then intimately bond together.

In another method, in which the vulcanising ingredients are added only to the insulating material, a sheet of conductive rubber about 0.01 inch thick and a sheet of the insulating material of the same thickness are rolled together on a calender thus forming a smooth sheet with no air spaces between the conductive rubber and the insulation. A thin layer of conductive rubber is applied to the conductor e. g. by extrusion, and a tape cut from the above sheet applied over the conductive rubber, with the conductive rubber of the composite tape on the inside. The insulation is then applied over the conductive rubber. If an outer metal sheath is to be used a lapping of the composite tape is applied over the insulation with the conductive rubber on the outside. The whole is then vulcanised.

The above methods can only be applied if the plastic insulation contains rubber. Another method of ensuring intimate contact between a conductive layer surrounding the inner conductor and the insulation which is applicable to plastic insulation which does not contain rubber as well as to plastic insulation which consists of or contains rubber is to provide a conductive layer impermeable to gas adjacent to the conductor and to apply gas pressure in the space surrounding the conductor, which pressure holds the conducting layer in intimate contact with the insulation. Thus in the case of a stranded conductor an inert gas such as carbon dioxide or nitrogen may be pumped into the interstices between the strands. The conductive layer in this case may be of any material impermeable to gas which can be extruded such as the conductive layer above referred to or a thin layer of extrudable metal such as lead. If the conductor be a solid conductor this layer must be applied somewhat loosely over the conductor and gas pressure is applied between the conductor and this thin sheath. In the more usual case of a stranded conductor however, the conducting layer may be extruded as tightly as possible over the conductor and gas pressure applied between the strands of the conductor. The gas pressure also maintains the insulation in compression between the impermeable conducting layer and any outer sheath and thus keeps the insulation in intimate contact with the outer sheath.

What is claimed is:

The method of manufacturing an insulated power cable which comprises applying a thin layer of conducting rubber to the surface of a conductor, then applying a layer of a composite tape prepared by rolling together a sheet of insulating rubber with a sheet of conducting rubber on a calender, the conducting surface of said composite tape being in contact with the conducting rubber on the surface of the conductor; enclosing the surface thus formed with a layer of insulating rubber and thereafter applying a layer of said composite tape having its non-conducting surface in contact with said insulating rubber and thereafter vulcanizing the whole assembly.

THOMAS ROBERTSON SCOTT.
JOHN KRAUSS WEBB.
JOHN FREDERICK MORLEY.